(12) United States Patent
Diller et al.

(10) Patent No.: US 11,564,360 B2
(45) Date of Patent: Jan. 31, 2023

(54) PLANTING POT AND TRAY SYSTEM AND METHOD

(71) Applicant: East Jordan Plastics, Inc., East Jordan, MI (US)

(72) Inventors: Scott P. Diller, East Jordan, MI (US); Mark S. Lercel, East Jordan, MI (US)

(73) Assignee: East Jordan Plastics, Inc., East Jordan, MI (US)

( * ) Notice: Subject to any disclaimer, the term of this patent is extended or adjusted under 35 U.S.C. 154(b) by 1073 days.

(21) Appl. No.: 15/923,145

(22) Filed: Mar. 16, 2018

(65) Prior Publication Data
US 2018/0263193 A1 Sep. 20, 2018

Related U.S. Application Data

(60) Provisional application No. 62/472,197, filed on Mar. 16, 2017.

(51) Int. Cl.
*A01G 9/02* (2018.01)
*A01G 9/00* (2018.01)

(52) U.S. Cl.
CPC .............. *A01G 9/027* (2013.01); *A01G 9/006* (2013.01)

(58) Field of Classification Search
CPC .... A01G 9/045; A01G 9/0295; A01G 9/0297; A01G 9/027; A47G 7/085; B65D 85/505; B65D 85/52; B65D 21/0233; B65D 1/36; B65D 1/34; B65D 85/34; B65D 85/60; B65D 85/08; B65D 85/42; B65D 85/50; B65D 85/54; B65B 25/026
USPC .......................... 47/66.7, 66.5; 206/423, 499
See application file for complete search history.

(56) References Cited

U.S. PATENT DOCUMENTS

| | | | |
|---|---|---|---|
| 4,684,013 A * | 8/1987 | Jacobs | A01G 9/028 206/423 |
| 4,887,388 A * | 12/1989 | Waltel, Jr. | A01G 25/02 47/79 |
| 7,454,864 B2 | 11/2008 | Smith et al. | |
| 7,673,417 B2 | 3/2010 | Smith et al. | |
| 7,818,918 B2 | 10/2010 | Smith et al. | |
| D734,205 S | 7/2015 | DeYoung et al. | |
| D734,688 S | 7/2015 | DeYoung et al. | |
| 9,338,948 B2 | 5/2016 | DeYoung et al. | |
| D765,544 S | 9/2016 | DeYoung et al. | |

(Continued)

OTHER PUBLICATIONS

2016 Product Catalog distributed by East Jordan Plastics, Inc. showing plant pots and trays.

*Primary Examiner* — Peter M Poon
*Assistant Examiner* — Jeffrey R Larsen
(74) *Attorney, Agent, or Firm* — Gardner, Linn, Burkhart & Ondersma LLP

(57) ABSTRACT

A planting pot and tray system comprises a plurality of pots and a tray having multiple receptacles configured to receive the pots. Each pot includes at least one rounded side, and at least one generally flat side, with each receptacle including at least one curved wall and at least one generally straight wall. The receptacles are configured to receive the pots with the rounded and flat sides of the pot engaging with respective walls of the receptacle to whereby the respective shapes of the receptacles and pots orient the pots within the receptacles. A front wall of the receptacle is shorter than the pot whereby a portion of side of the pot is exposed and directed outwardly from the tray.

20 Claims, 12 Drawing Sheets

(56) References Cited

U.S. PATENT DOCUMENTS

| | | | |
|---|---|---|---|
| 2004/0211118 A1* | 10/2004 | Smith | A01G 9/021 |
| | | | 47/66.5 |
| 2012/0066970 A1* | 3/2012 | Contillo, III | A01G 9/045 |
| | | | 47/66.6 |
| 2012/0205385 A1* | 8/2012 | Crosby | B65D 1/26 |
| | | | 220/600 |
| 2016/0029572 A1* | 2/2016 | Stott | A01G 9/04 |
| | | | 47/66.7 |
| 2016/0194112 A1* | 7/2016 | Dziaba | B65D 43/0204 |
| | | | 206/505 |

* cited by examiner

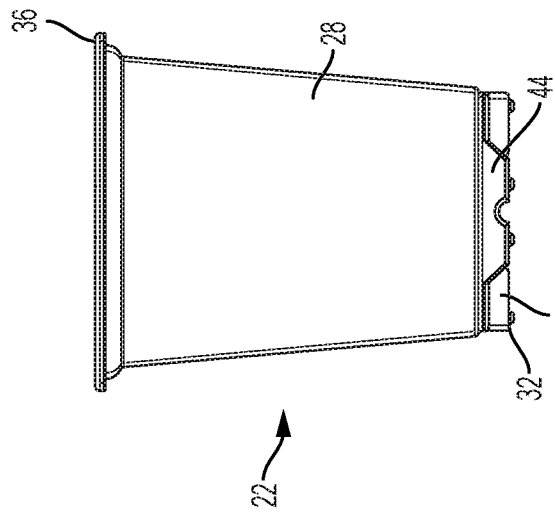
FIG. 3
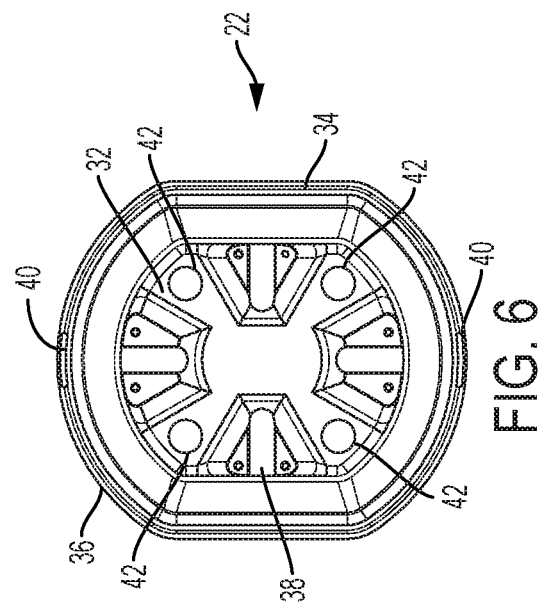
FIG. 4
FIG. 6
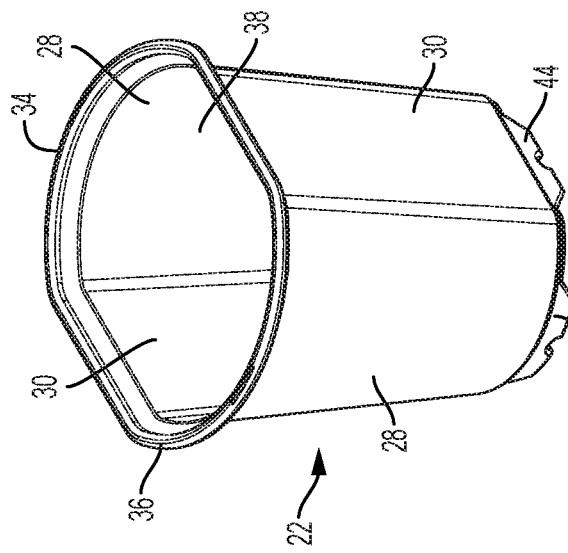
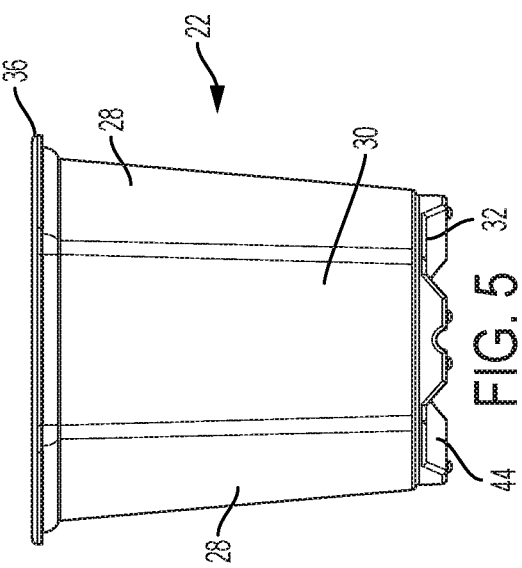
FIG. 5

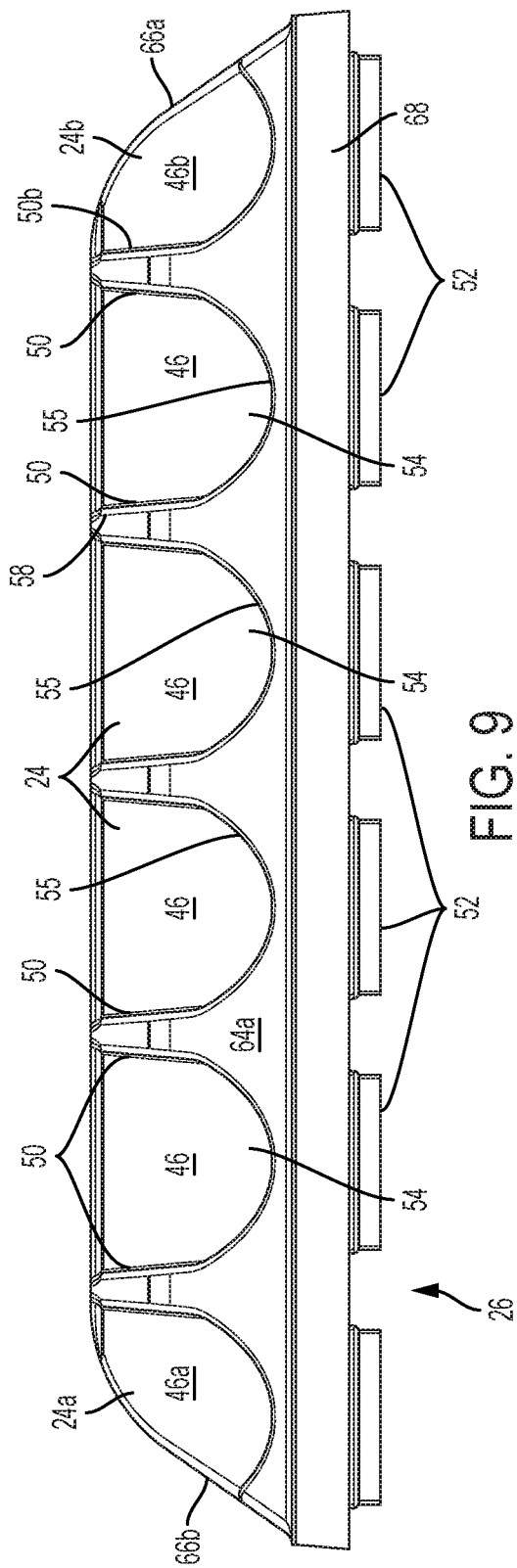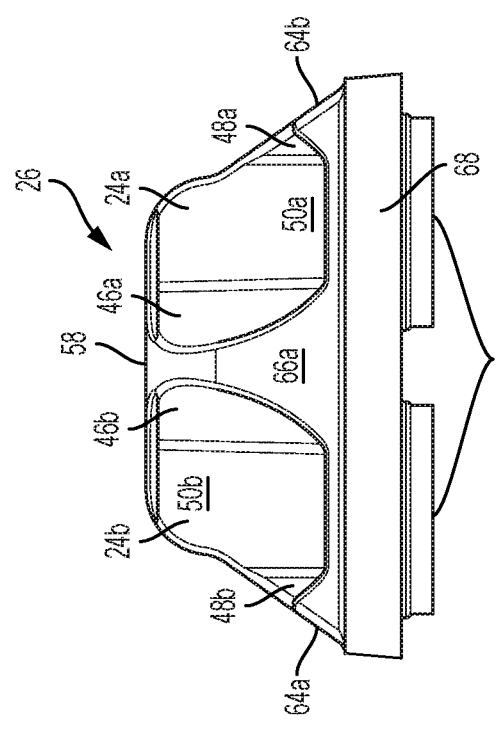

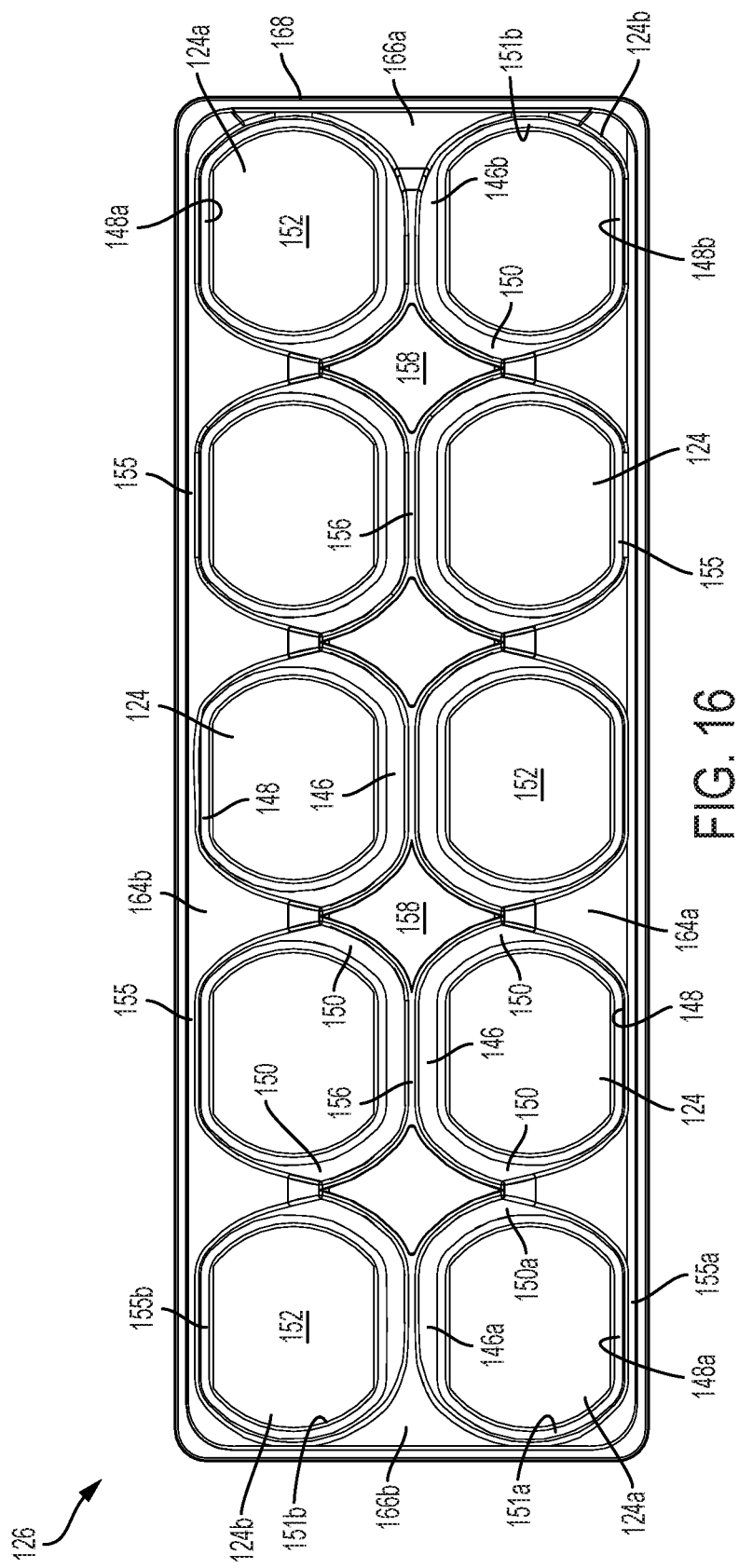

PLANTING POT AND TRAY SYSTEM AND METHOD

The present application claims priority of U.S. provisional application Ser. No. 62/472,197 filed Mar. 16, 2017, which is hereby incorporated by reference in its entirety.

BACKGROUND OF THE INVENTION

The present invention is directed to a planting pot and tray system, and in particular a system with pots that have a selected surface that is exposed for visibility when retained within a tray, such as a particular side surface, including curved or rounded or flat surfaces.

Plant trays having multiple locations in which pots may be retained are used in the horticultural industry for simultaneously holding and transporting multiple plant pots, including pots for flowering and non-flowering plants. All manner of different types of plants are distributed in such pots and trays by growers, wholesalers and/or retailers in the growing and distribution of such plants. Identification of the plants, including based on the type and/or size, as well as information regarding planting instructions, and/or information regarding the supplier are provided in order to inform individuals along the supply chain, including purchasers, regarding the plants contained within the pots.

SUMMARY OF THE INVENTION

The present invention provides a planting pot and tray system in which multiple pots that include a curved or rounded surface upon which information may be printed are receivable within a tray and when so received the surface is exposed for visibility.

According to an aspect of the present invention, a planting pot and tray system comprises a plurality of pots and a tray having multiple receptacles configured to receive the pots, with the sides of the pots and the walls of the receptacles shaped and configured to align with one another for aligning the pots within the receptacles such that a side of the pot is outwardly oriented.

In a particular embodiment each pot includes a bottom, at least one rounded side, and at least one generally flat side, with the rounded side and flat side extending upwardly from the bottom. Each receptacle of the tray includes a base, at least one curved wall and at least one generally straight side wall, with the curved wall and straight side wall extending upwardly from the base. The receptacles are configured to receive the pots with the bottom of the pot supported on the base of the receptacle. According to an embodiment, a rounded side of the pot is aligned with a curved wall of the receptacle and a flat side of the pot is aligned with a straight wall of the receptacle whereby the respective shapes of the receptacle and pot orient the pot within the receptacle. In a particular embodiment, a front wall that comprises a curved wall or a straight wall of the receptacle is shorter than a rear wall whereby a portion of the side of the pot is exposed and directed outwardly from the tray when the pot is received within the receptacle.

In a still further embodiment, each pot includes a pair of opposed rounded sides, and a pair of opposed generally flat sides, with the rounded sides and said flat sides extending upwardly from the bottom. Correspondingly, each receptacle of the tray includes a base, a pair of opposed curved walls and a pair of opposed generally straight walls, with the curved walls and straight walls extending upwardly from the base. One of the curved walls or straight walls of the receptacle comprises a front wall with the front wall being shorter than the pot whereby a portion of the side of the pot aligned with the front wall is exposed when the pot is received within the receptacle, and wherein the exposed side of the pot is directed outwardly from the tray, such as to expose indicia printed on the pot.

In particular embodiments the tray may include a generally horizontal upper wall with the receptacles including receptacle openings for receiving the pots, with the receptacle openings being at least partially formed in the upper wall. The tray may have a generally rectangular perimeter, with the tray including four angled side walls that extend from the perimeter of the tray upward toward the top wall at an inwardly directed angle. In such an embodiment the tray may include two parallel rows of receptacles.

A method of using the tray system involves aligning a rounded side of each pot with a curved wall of a receptacle and inserting the pot into the receptacle whereby a rounded side of a pot is outwardly oriented and exposed for visibility.

The planting pot and tray system of the present invention enable planting pots to be self-oriented within receptacles of a tray whereby a particular side of the pots may be oriented outwardly for visibility, such as a rounded or flat side with indicia printed thereon that is then visible to a consumer. In an illustrated embodiment the pots include two opposed rounded sides with the pots being insertable into the receptacles in either of two directions or orientations such that one of the sides is exposed via an opening in the receptacles. These and other objects, advantages, purposes and features of this invention will become apparent upon review of the following specification in conjunction with the drawings.

BRIEF DESCRIPTION OF THE DRAWINGS

FIG. 3 is a top perspective view of the pot of FIG. 2;

FIG. 4 is a front elevation view of the pot of FIG. 2;

FIG. 5 is a side elevation view of the pot of FIG. 2;

FIG. 6 is a top elevation view of the pot of FIG. 2;

FIG. 9 is a side elevation view of the tray of FIG. 7;

FIG. 10 is a front elevation view of the tray of FIG. 7;

FIG. 16 is a top elevation view of the tray of FIG. 12.

DESCRIPTION OF THE PREFERRED EMBODIMENTS

Figure 1:
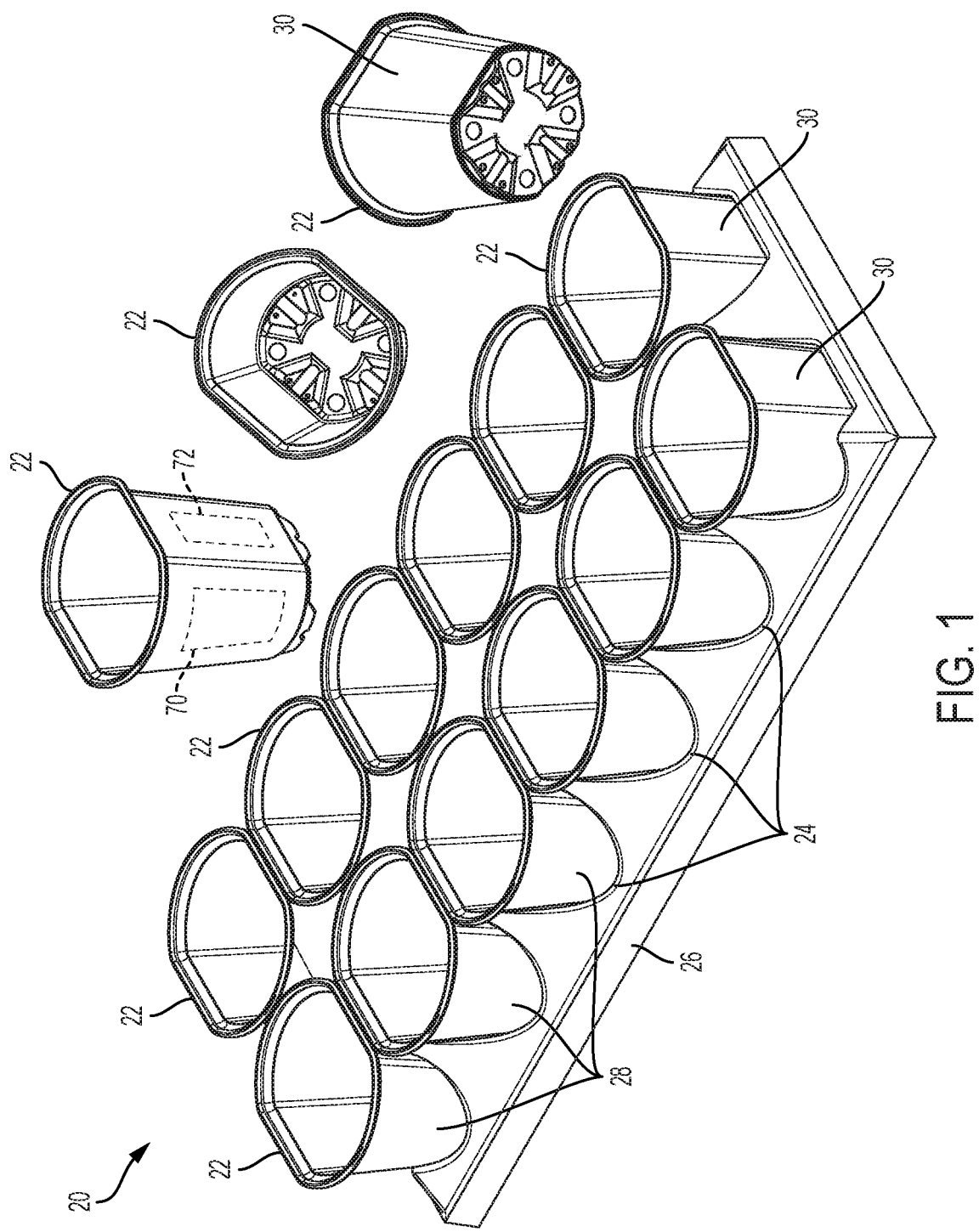
FIG. 1 is a perspective view of a planting pot and tray system in accordance with the present invention shown with additional pots.

The present invention will now be described with reference to the accompanying figures, wherein the numbered elements in the following written description correspond to like-numbered elements in the figures. A planting pot and tray system 20 is shown in accordance with an embodiment of the present invention, with system 20 including multiple pots 22 that are selectively inserted within receptacles 24 of tray 26. The pots 22 include at least one curved or rounded surface or side 28 that, when inserted to receptacles 24, are exposed. Indicia may be applied to a rounded side 28 of pots 22, such as by way of offset printing, whereby when the pots are installed within receptacles 24 the printed indicia is visible. As discussed in more detail below, the pots 22 and receptacles 24 are configured to orient the pots 22 in a particular orientation within receptacles 24 when the pots 22 are inserted into tray 26 whereby the indicia on rounded side 28 is properly oriented for visibility, such as by a consumer.

Referring to FIGS. 2-6, each pot 22 in the illustrated embodiment is shown to include two rounded surfaces or sides 28 that are opposed from each other, and two straight or flat surfaces or sides 30 that are likewise opposed from each other and separate the two rounded sides 28. As shown, each rounded side 28 is connected with and located between the two flat sides 30. Rounded sides 28 and flat sides 30 extend upwardly from a bottom 32 of pot 22, with the sides 28 and 30 extending upwardly from bottom 32 at a non-perpendicular, outwardly oriented angle relative to bottom 32. As such, the upper opening 34 of pot 22 is larger in size than bottom 32 (see FIG. 6). Pot 22 further includes an upper lip 36 that bounds the opening 34 into the cavity 38 of pot 22, with lip 36 projecting radially outwardly beyond the sides 28 and 30. Lip 36 in turn includes apertures 40 that may be used to receive a handle, plant tag, or the like.

Figure 2:
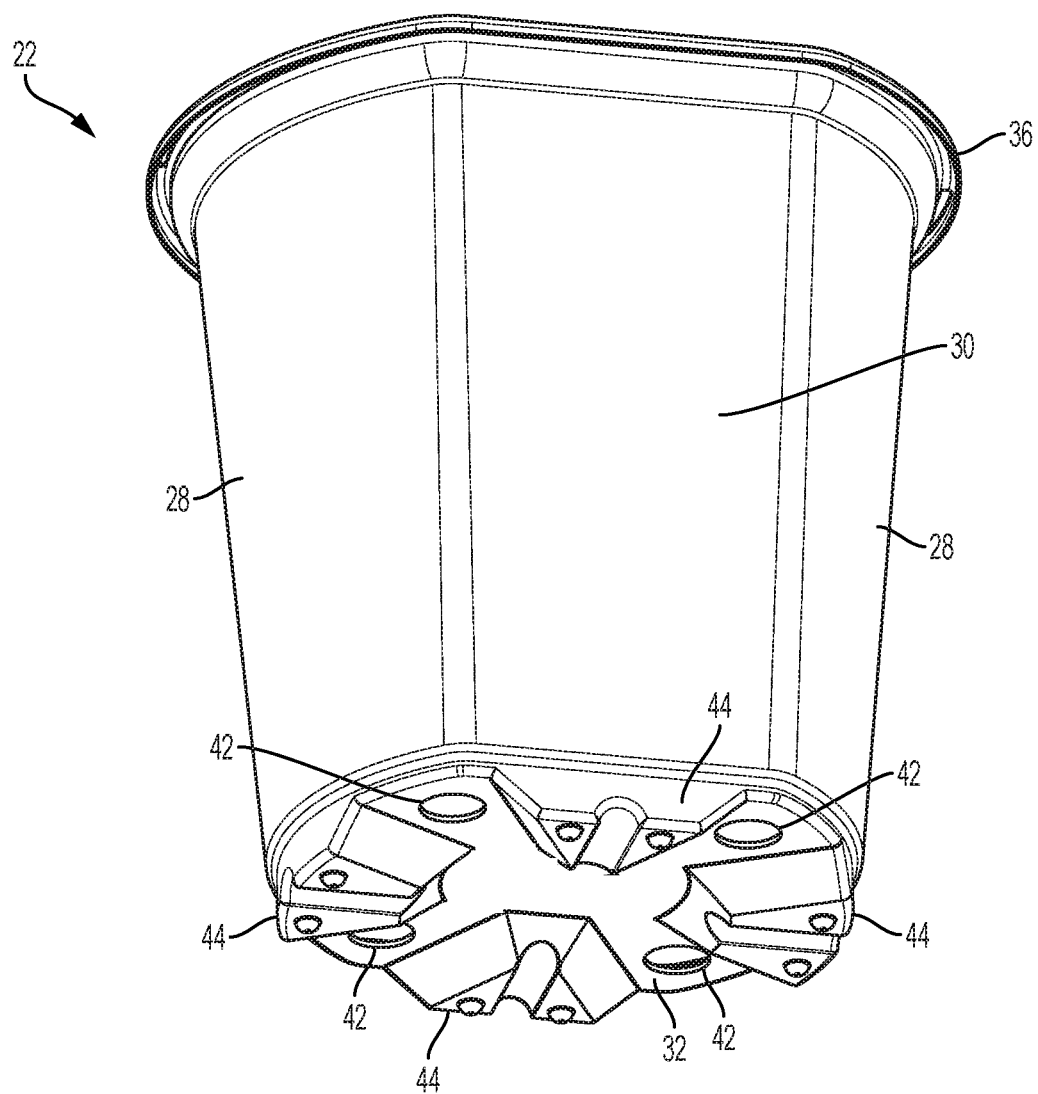
FIG. 2 is a bottom perspective view of a pot from FIG. 1 shown removed from the tray.
Figure 7:
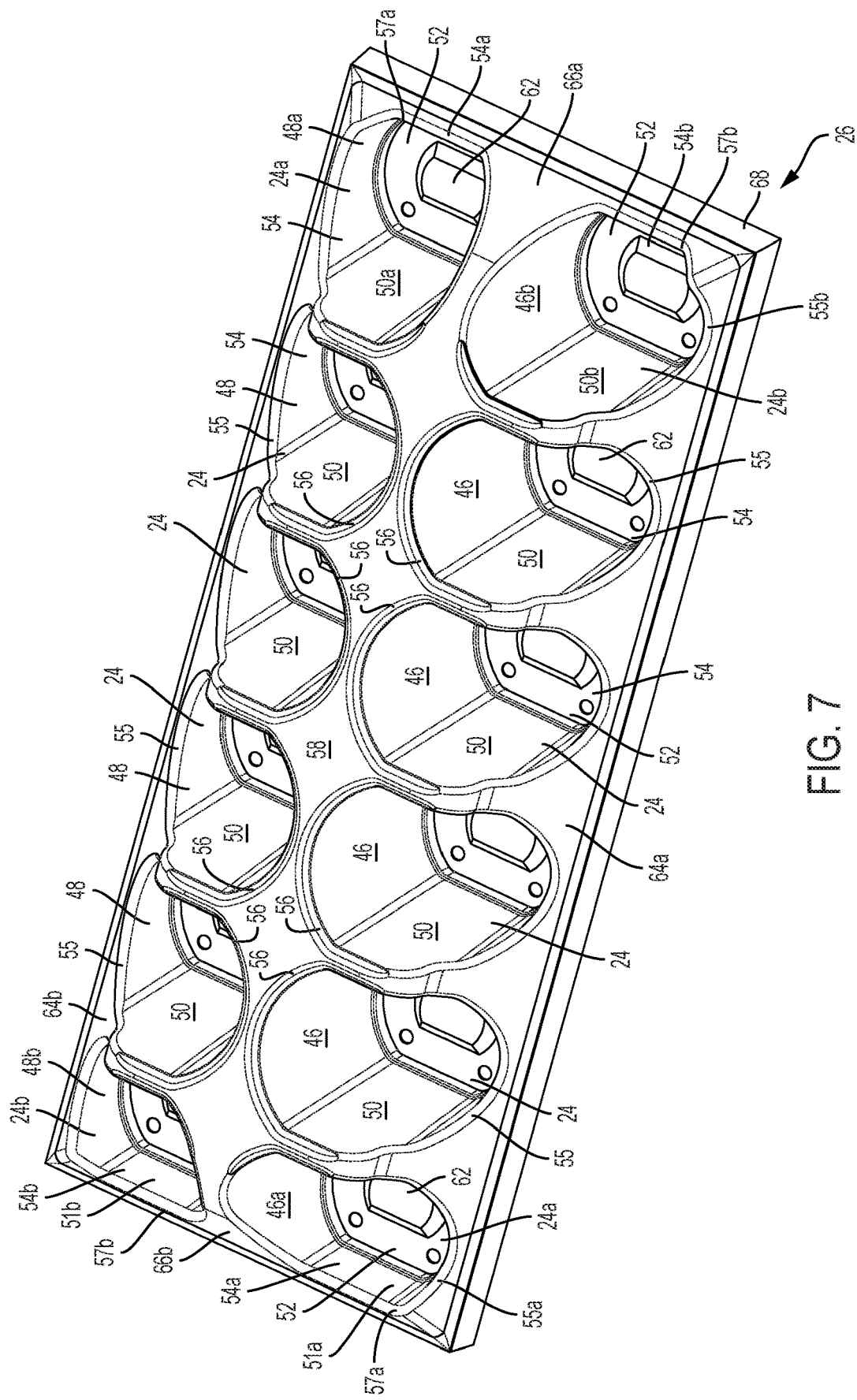
FIG. 7 is a top perspective view of the tray of FIG. 1 shown with the pots removed.

Bottom 32 includes multiple drainage holes 42 and, as best understood from FIG. 2, includes multiple downwardly extending projections 44 on an underside of bottom 32. In the illustrated embodiment projections 44 are disposed toward the outer periphery of bottom 32 and are configured to have a generally wedge shape with the drainage holes 42 disposed between the wedge shaped projections 44. As discussed in more detail below, the projections 44 elevate bottom 32 from the bottom of tray 26 such that holes 32 are spaced from tray 26 to inhibit holes 32 from being blocked and thereby promoting the drainage of water from holes 42 as necessary.

In the illustrated embodiment pots 22 are constructed of plastic by a molding process whereby pots 22 are unitarily formed, with pots 22 being sufficiently rigid to be self-supporting and able to retain a planting within cavity 38.

Referring now to FIGS. 7-11, tray 26 in the illustrated embodiment is likewise constructed of plastic by a molding process, with tray 26 being of sufficient strength and rigidity to hold pots 22 with plantings therein. Tray 26, moreover, includes two rows of six receptacles 24 each in the illustrated embodiment. It should be appreciated, however, that alternatively configured and shaped trays, including trays with more or fewer receptacles, may be employed within the scope of the present invention.

In the illustrated embodiment, tray 26 includes two pairs of end receptacles 24a and 24b that are located on opposite ends of tray 26, with the remaining receptacles 24 being disposed there between. Receptacles 24 of tray 26 are configured to mate with pots 22 to thereby orient pots 22 within receptacles 24. As such, receptacles 24 that are located between the end receptacles 24a and 24b include a curved or rounded rear surface or wall 46, a curved or rounded front surface or wall 48, and a pair of straight or flat side walls 50. The walls 48, 50 are outwardly slanted or tapered from bottom 52 whereby the rounded sides 28 of pots 22 thus mate or align with the curved walls 46, 48 of receptacles 24, and the flat sides 30 of pots correspondingly mate or align with straight side walls 50 of receptacle. As such, in the illustrated embodiment pots 22 are only able to be inserted into tray 26 in one of two orientations, where in either orientation one of the two rounded sides 28 of pots 22 will be facing outwardly. That is, due to the oblong perimeter or peripheral profile of pots 22 and correspondingly shaped receptacles 24, pots 22 will not fit within receptacles 24 unless they are oriented such that one rounded side 28 is facing outwardly and the other is facing inwardly.

Moreover, receptacles 24 further include a base or bottom 52 with front curved walls 48 having a reduced height from base 52 relative to the heights of side walls 50 and rear curved wall 46. The reduced height of front curved walls 48 thus form or define side openings 54 of receptacles 24 whereby when pots 22 are inserted into receptacles 24, at least a portion of the outwardly facing rounded side 28 of the pots 22 will be exposed via openings 54. Indicia located on the exposed rounded sides 28 of the pots 22 will thus be visible to a consumer. In the illustrated embodiment front curved walls 48 of receptacles 24 include a curved edge 55 to form a scalloped opening 54. When pots 22 are inserted into receptacles 24, the front curved wall 48 only extends to approximately one-quarter or one-third of the height of the outwardly oriented rounded side 28. In contrast, as understood from FIG. 1, rear curved walls 46 in the illustrated embodiment are approximately the same height at pots 22 whereby when pots 22 are inserted into receptacles 24 the upper lip 36 is at or adjacent the top 58 of tray 26.

Receptacles additionally include an upper perimeter channel or recess 56 formed in an upper wall 58 of tray 26, with the recess 56 being disposed about the upper portions of rear curved wall 46 and straight side walls 50. As understood from FIG. 1, a portion of the lips 36 of pots 22 are received within channels 56 when the pots 22 are inserted into the receptacles 24, including to thereby further aid in securing or retaining pots 22 within receptacles 24.

The bottoms 52 of the receptacles 24, including receptacles 24a and 24b, include four drainage openings 60 that generally align with the openings 34 of pots 22 when the pots 22 are inserted into receptacles to thereby allow excess water to drain from pots 22 and out tray 26. Bottoms 52 further include a centrally located upward projection or protrusion 62 and an outer perimeter surface 64 disposed about protrusion 62. When pots 22 are inserted into receptacles 24, the downward projections 44 on the bottom 32 of pots 22 are supported on surface 64, with the upward projection 62 of the bottoms 52 of receptacles 24 then positioned centrally of the downward projections 44 of pots 22. It should be appreciated that the downward projections 44 of pots 22 and upward projections 62 or receptacles 24 do not function to align pots 22 within receptacles 24. Rather, the correspondingly shaped walls 46, 48 of receptacles 24 to the sides 28, 30 of pots 22 require the proper alignment of the pots 22 within the receptacles 24 as the pots 22 are being inserted therein prior to the bottom 32 of the pots 22 reaching or contacting the bottom 52 of the receptacles 24.

In addition to upper wall 58, which is generally horizontal and planar in the illustrated embodiment, tray 26 further includes opposed upwardly angled outer side walls 64a, 64b and end side walls 66a, 66b, where walls 64a, 64b and 66a, 66b angle upwardly from an outer perimeter defined by a vertical edge wall 68 disposed about tray 26, and extend to upper wall 58. Of note, angled outer side walls 64a, 64b form the openings 54 in receptacles 24 by intersecting with the cavities or receptacles 24.

The end receptacles 24a, 24b are substantially similar to the receptacles 24 disposed there between and described above, with the end receptacles 24a, 24b, respectively, including curved front walls 48*a*, 48*b*, curved rear walls 46*a*, 46*b*, and straight side wall 50*a*, 50*b*. Each end receptacle 24*a*, 24*b*, however, includes an additional opening 54*a*, 54*b* formed by the angled end walls 66*a*, 66*b* intersecting with the cavities of the end receptacles 24*a*, 24*b* which forms edges 55*a*, 55*b*. Moreover, receptacles 24*a*, 24*b* thus additionally include a shorter straight side wall 51*a*, 51*b* due to openings 54*a*, 54*b*. The openings 54*a*, 54*b* thus expose a flat side 30 of pots 22, which may additionally include indicia if so desired. As shown, the openings 54*a*, 54*b* form or include a straight edge 57*a*, 57*b* on the ends of the tray 26.

Figure 8:
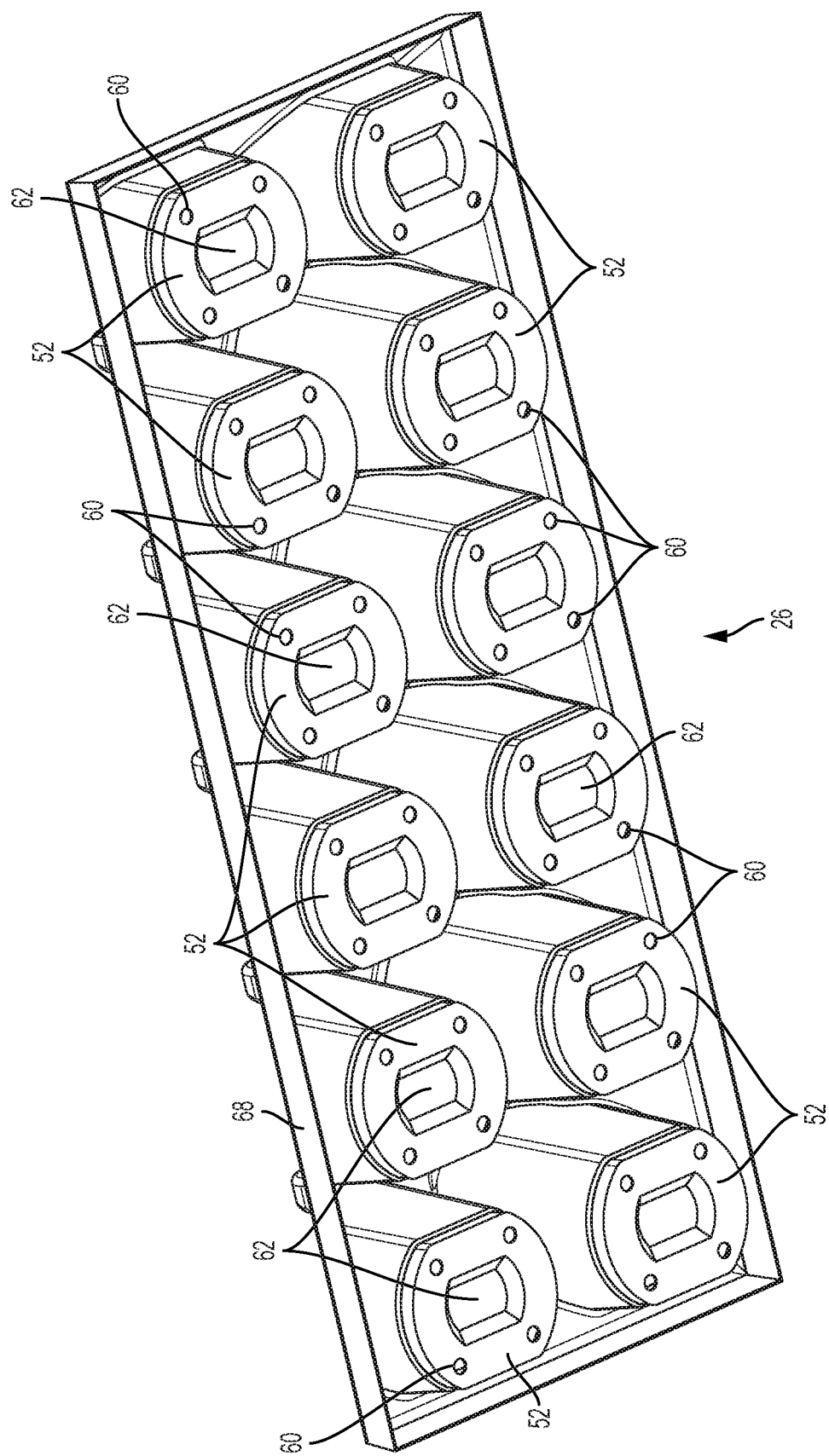
FIG. 8 is a bottom perspective view of the tray of FIG. 7.
Figure 11:
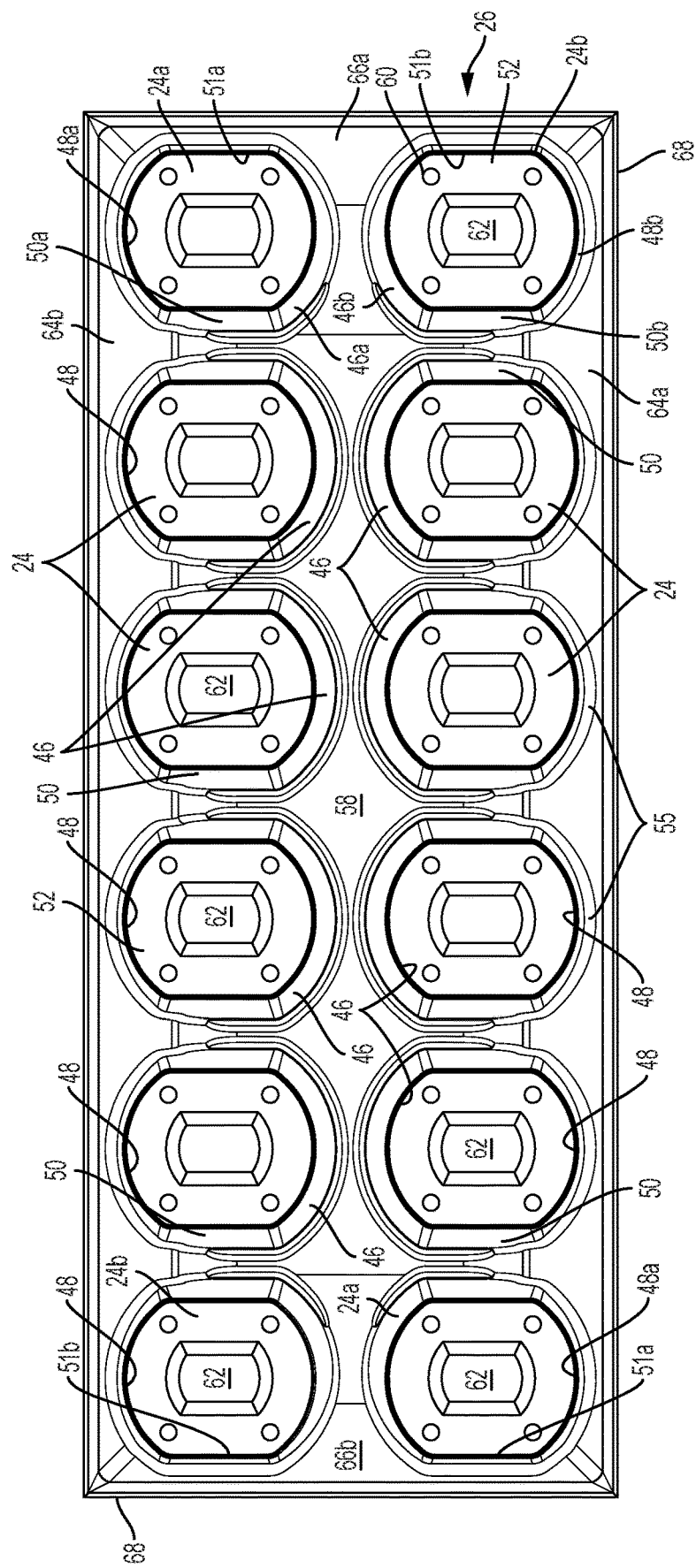
FIG. 11 is a top elevation view of the tray of FIG. 7.
Figure 12:
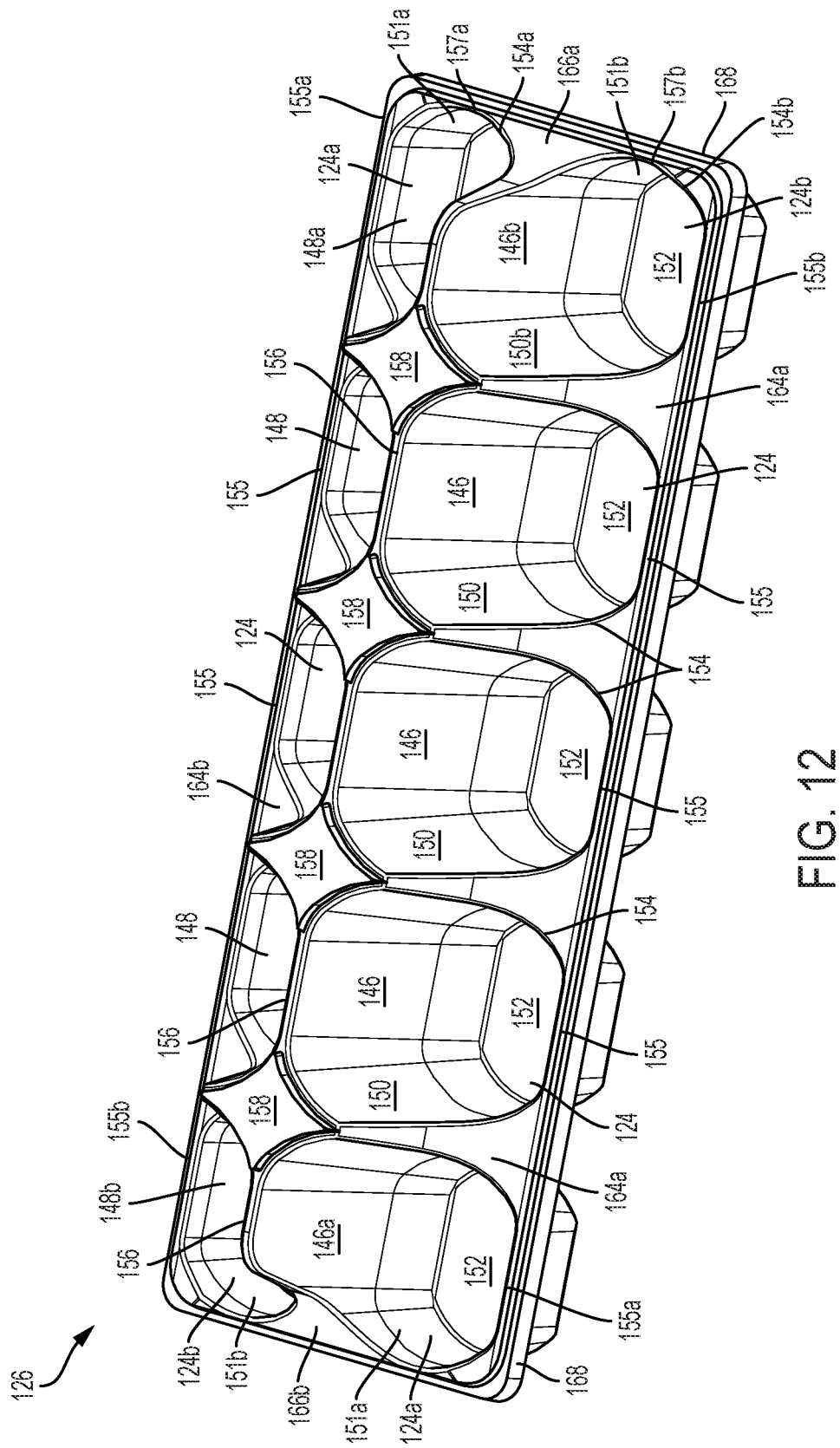
FIG. 12 is a top perspective view of an alternative tray for use with pots of FIG. 2 in accordance with the present invention.
Figure 13:
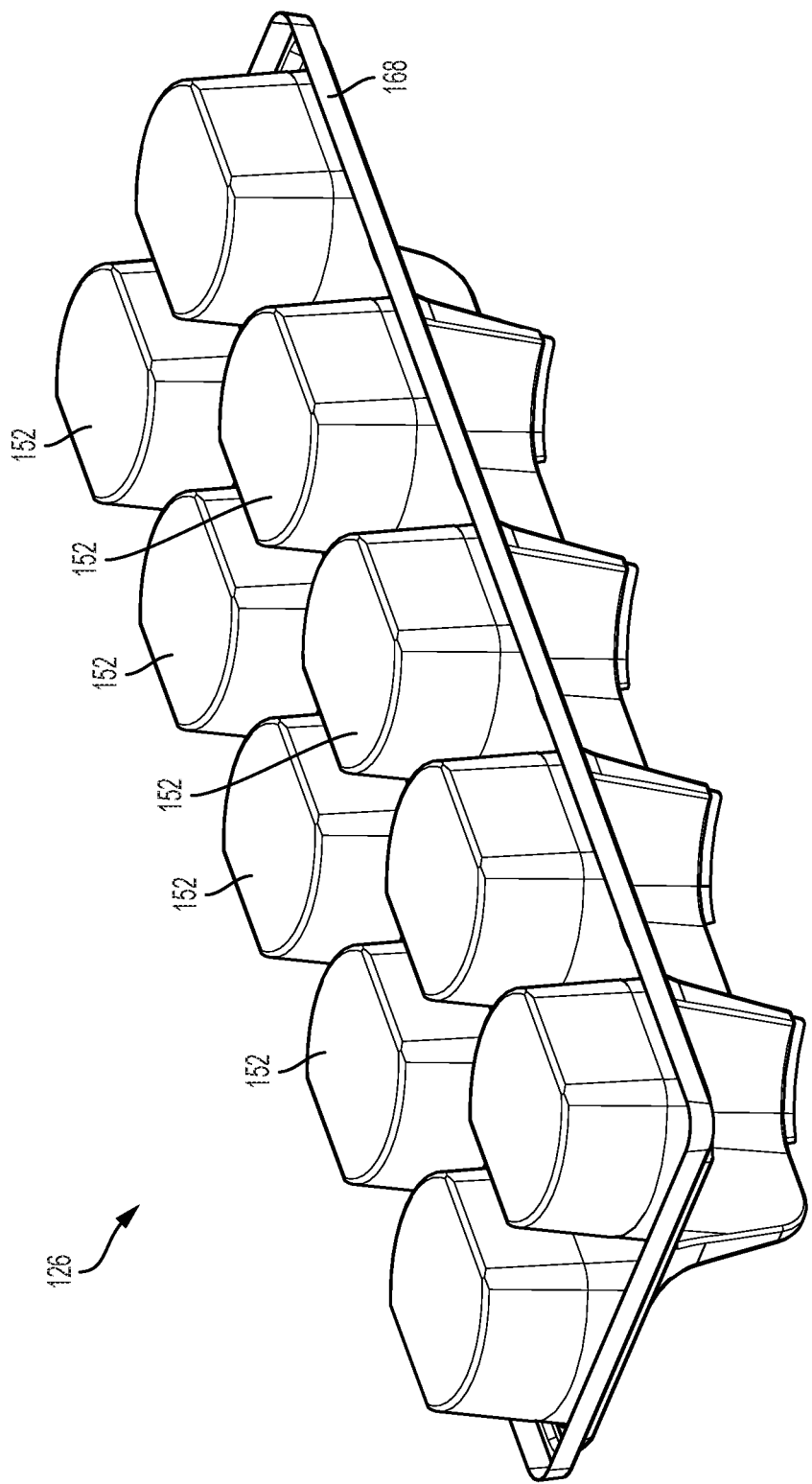
FIG. 13 is a bottom perspective view of the tray of FIG. 12.
Figure 14:
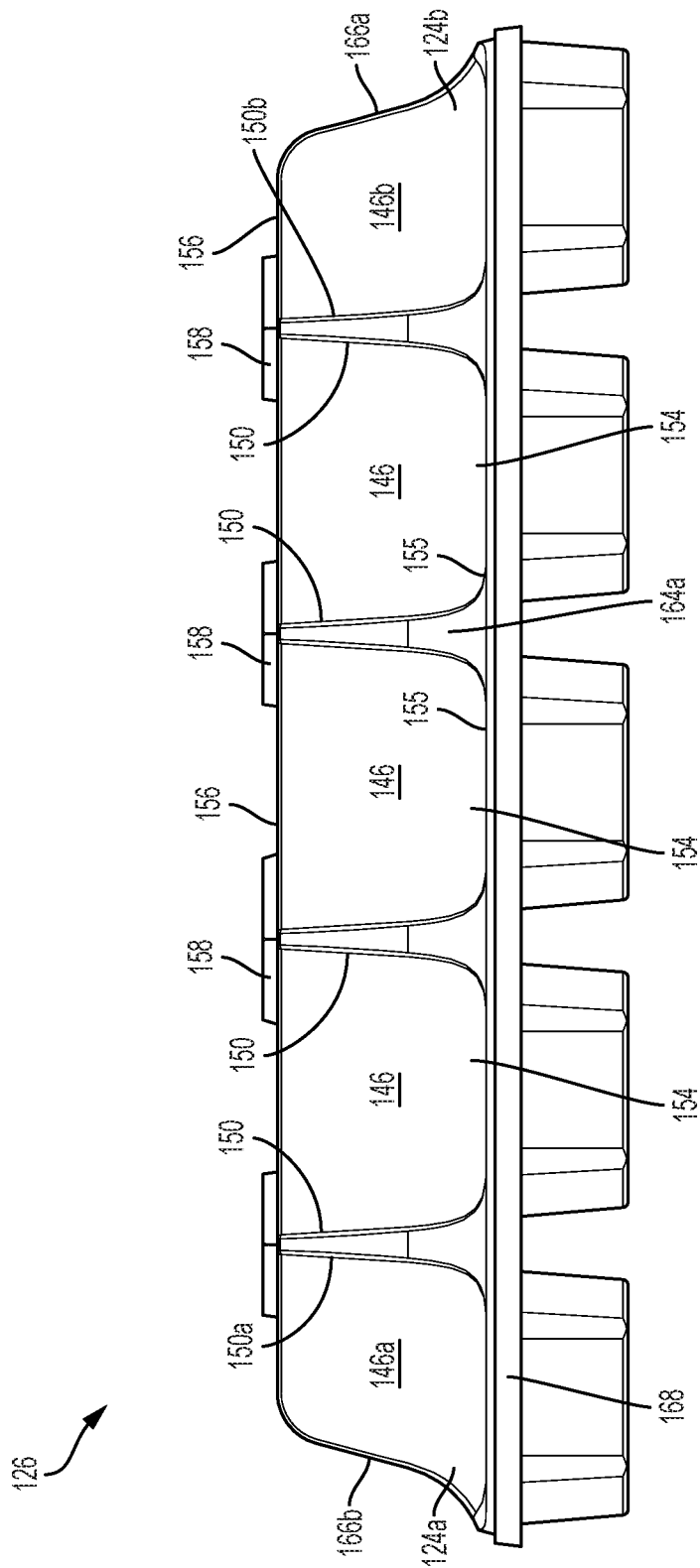
FIG. 14 is a side elevation view of the tray of FIG. 12.
Figure 15:
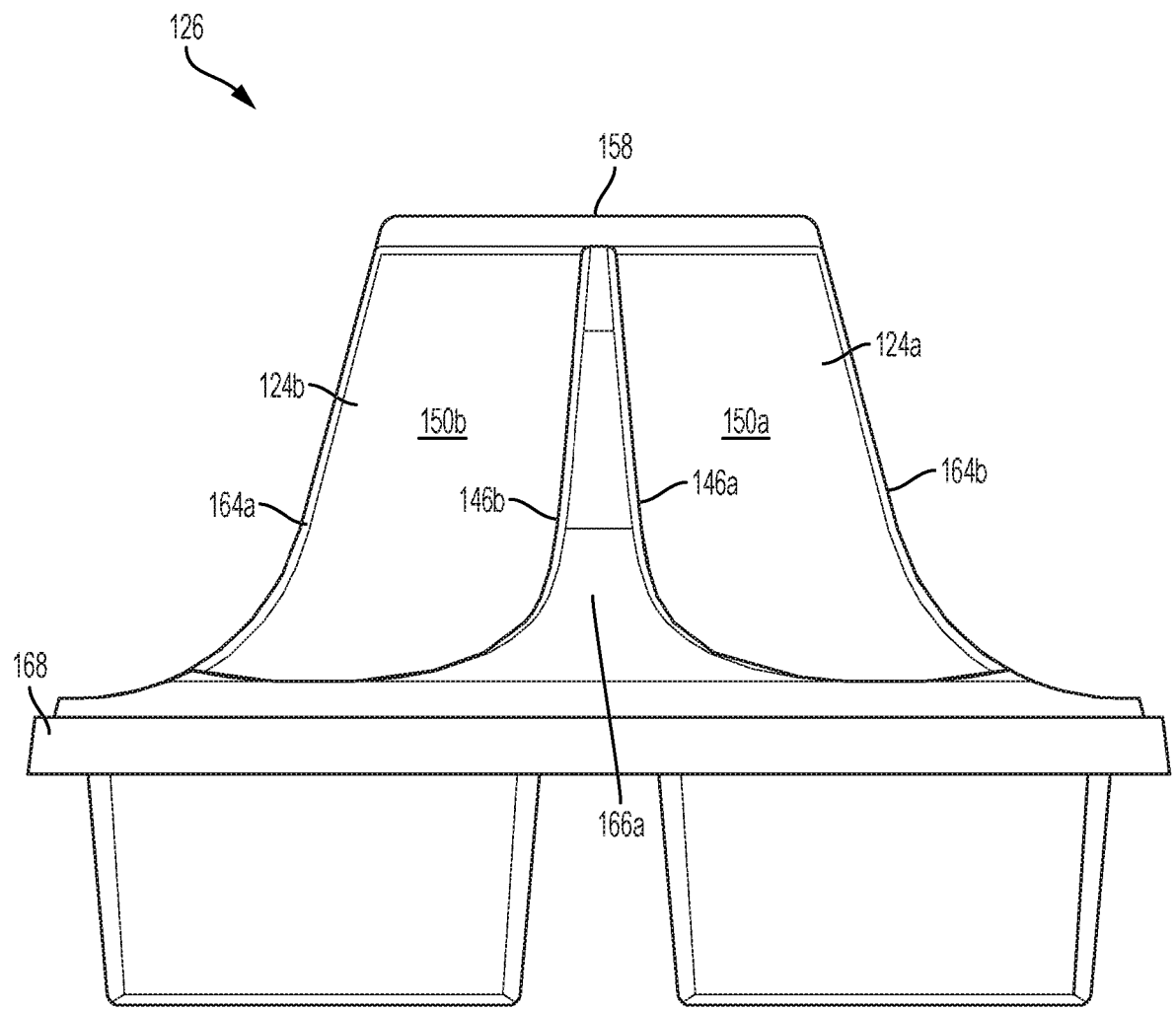
FIG. 15 is a front elevation view of the tray of FIG. 12.

As best understood from FIGS. 8 and 11, the cavities of the receptacles 24 taper upwardly to a larger opening relative to the size of the bottoms 52 of the receptacles. This is in similar manner to the taper of pots 22.

As noted, indicia, such as indicia 70 illustrated on a pot shown in FIG. 1, may be printed on the rounded side 28 of pot 22 that is directed outwardly when inserted into tray 26, such as by way of offset printing. As also noted, it should be appreciated that indicia 70 may be printed on both rounded sides 28 of pot 22. Various indicia may also be applied to flat sides 30 of pot, such as indicia 72 illustrated on a pot 22 in FIG. 1. The indicia may include numerous types of information, including by way of example only, the type of planting contained therein, information on its care, the name of the grower, pricing information, bar code information, or other marketing related information, including pictures and trademarks. The exposed side portion of a pot 22 containing the indicia 70, or 72 as discussed below, thus provides information to an individual, such as a retail consumer or otherwise, regarding the plant.

Referring now to FIGS. 12-16, an alternative tray 126 is disclosed, where tray 126 is likewise configured for use with pots 22. Tray 126 shares similar features to tray 26, but instead of orienting pots 22 to have an outwardly exposed rounded side 28, tray 126 is configured to orient pots 22 to have an outwardly exposed flat side 30. Not all of the features and functions of tray 126 are discussed herein due to the similarities of tray 126 with tray 26, with "100" being added to the like corresponding reference numerals of tray 26.

Tray 126 is likewise constructed of plastic and includes two rows of five receptacles 124 each in the illustrated embodiment. It should be appreciated, however, that alternatively configured and shaped trays, including trays with more or fewer receptacles, may be employed within the scope of the present invention.

In the illustrated embodiment, tray 126 includes two pairs of end receptacles 124*a* and 124*b* that are located on opposite ends of tray 126, with the remaining receptacles 124 being disposed there between. Receptacles 124 of tray 126 are configured to mate with pots 22 to thereby orient pots 22 within receptacles 124 with a flat side 30 of the pots 22 outwardly facing. As such, receptacles 124 that are located between the end receptacles 124*a* and 124*b* include a flat or straight rear surface or wall 146, a flat or straight front surface or wall 148, and a pair of curved or rounded side walls 150. The walls 146, 148, 150 are outwardly slanted or tapered from bottom 152 whereby the rounded sides 28 of pots 22 thus mate or align with the curved walls 150 of receptacles 24, and the flat sides 30 of pots correspondingly mate or align with straight side walls 146, 148 of receptacle. As such, in the illustrated embodiment pots 22 are only able to be inserted into tray 126 in one of two orientations, where in either orientation one of the two flat sides 30 of pots 22 will be facing outwardly. That is, due to the oblong perimeter or peripheral profile of pots 22 and correspondingly shaped receptacles 124, pots 22 will not fit within receptacles 124 unless they are oriented such that one flat side 30 is facing outwardly and the other is facing inwardly.

Moreover, receptacles 124 further include a base or bottom 152 with front flat walls 148 having a reduced height from base 152 relative to the heights of side walls 150 and rear wall 146. The reduced height of front flat walls 148 thus form or define side openings 154 of receptacles 124 whereby when pots 22 are inserted into receptacles 124, at least a portion of the outwardly facing flat side 30 of the pots 22 will be exposed via openings 154. Indicia located on the exposed flat sides 30 of the pots 22 will thus be visible to a consumer. In the illustrated embodiment front flat walls 148 of receptacles 124 include a straight edge 155 at opening 154. When pots 22 are inserted into receptacles 124, the front flat wall 148 only extends to approximately one-quarter or one-third of the height of the outwardly oriented flat side 128 in the illustrated embodiment. In contrast, rear flat walls 146 in the illustrated embodiment are approximately the same height at pots 22 whereby when pots 22 are inserted into receptacles 124 the upper lip 36 of the pot 22 is at or adjacent the top 158 of tray 126. It should be appreciated that in either embodiment the top of the tray 26 or 126 maybe recessed from the top or lip of the pot 22.

Receptacles additionally include upper perimeter channels or recesses 156 formed in an upper wall 158 of tray 26, with the recesses 156 being disposed about the upper portions of rear flat wall 146 and a portion of the curved side walls 150. A portion of the lips 36 of pots 22 are received within channels 156 when the pots 22 are inserted into the receptacles 124.

Although not shown, the bottoms 152 of the receptacles 124, including receptacles 124*a* and 124*b*, may include drainage openings. Bottoms 152 may further include a centrally located upward projection or protrusion and an outer perimeter surface disposed about such a protrusion.

In addition to upper wall 158, which is generally horizontal and planar in the illustrated embodiment, tray 126 further includes opposed upwardly angled outer side walls 164*a*, 164*b* and end side walls 166*a*, 166*b*, where walls 164*a*, 164*b* and 166*a*, 166*b* angle upwardly from an outer perimeter defined by a vertical edge wall 168 disposed about tray 126, and extend to upper wall 158. Of note, angled outer side walls 164*a*, 164*b* form the openings 154 in receptacles 124 by intersecting with the cavities or receptacles 124.

The end receptacles 124*a*, 124*b* are substantially similar to the receptacles 124 disposed there between and described above, with the end receptacles 124*a*, 124*b*, respectively, including flat or straight front walls 148*a*, 148*b*, flat or straight rear walls 146*a*, 146*b*, and curved side walls 150*a*, 150*b*. Each end receptacle 124*a*, 124*b*, however, includes an additional opening 154*a*, 154*b* formed by the angled end walls 166*a*, 166*b* intersecting with the cavities of the end receptacles 124*a*, 124*b* which forms edges 155*a*, 155*b*. Moreover, receptacles 124*a*, 124*b* thus additionally include a shorter curved side wall 151*a*, 151*b* due to openings 154*a*, 154*b*. The openings 154*a*, 154*b* thus expose a rounded side 28 of pots 22, which may additionally include indicia if so desired. As shown, the openings 154*a*, 154*b* form or include a straight edge 157*a*, 157*b* on the ends of the tray 126.

As best understood from FIG. 16, the cavities of the receptacles 124 taper upwardly to a larger opening relative to the size of the bottoms 152 of the receptacles. This is in similar manner to the taper of pots 22.

In the illustrated embodiment of pot 22 the sides 30 are noted as comprising flat sides 30. It should be appreciated that the flat sides 30 of pot 22 between rounded sides 28 may be formed to be slightly concave or convex, which may aid in inhibiting pots 22 from becoming wedged or stuck within receptacles 24 and, thus, aid in removal of pots 22 from receptacles 24. Even if formed to be slightly concave or convex, sides 30 would still comprise flat sides or generally flat sides within the meaning of the present invention. Still further, although in the illustrated embodiment trays 26 and 126 include two parallel rows of receptacles, with each row having six receptacles and five receptacles, respectively, that alternative arrangements and numbers of receptacles in a tray may be employed within the scope of the present invention. Other changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A planting pot and tray system, said system comprising:
   a plurality of pots, each said pot having a bottom, a pair of opposed rounded sides, and a pair of opposed flat sides, with said rounded sides and said flat sides extending upwardly from said bottom;
   a tray, said tray including a plurality of receptacles configured to receive said pots, said receptacles including a base, a pair of opposed curved walls and a pair of opposed straight walls, with said curved walls and said straight walls extending upwardly from said base;
   wherein said receptacles are configured to receive said pots with said rounded sides of said pots being aligned and mating with said curved walls of said receptacles, and with said flat sides of said pots aligned and mating with said straight walls of said receptacles whereby the respective shapes of said receptacles and said pots orient said pots within said receptacles; and
   wherein said receptacles include an outwardly facing opening whereby when said pots are received within said receptacles side portions of said pots are aligned with said openings to comprise exposed side portions, wherein said exposed side portions comprises one of said rounded sides of said pots or one of said flat sides of said pots, and wherein said receptacles and said pots are configured such that each said pot is insertable into said receptacles in either of two orientations with either of said rounded sides comprising said exposed side portion or either of said flat sides comprising said exposed side portion.

2. The planting pot and tray system of claim 1, wherein said receptacles comprise opposed side walls, a rear wall and a front wall, and wherein said rear wall extends higher than said front wall and said outwardly facing opening is located adjacent said front wall.

3. The planting pot and tray system of claim 2, wherein said front wall of said receptacles comprises one of said curved walls and said exposed side portions of each said pot comprise one of said rounded sides.

4. The planting pot and tray system of claim 2, wherein said front wall of said receptacles comprises one of said straight walls, and said exposed side portions of each said pot comprise one of said flat sides.

5. The planting pot and tray system of claim 2, wherein said rear wall comprises one of said curved walls, and wherein said straight walls of said receptacles comprise said side walls of said receptacles and are located adjacent said rear wall.

6. The planting pot and tray system of claim 2, wherein said rear wall comprises one of said straight walls, and wherein said curved walls of said receptacles comprise said side walls of said receptacles and are located adjacent said rear wall.

7. The planting pot and tray system of claim 1, wherein said pots include a lip defining an opening at an upper end of said pots opposite said bottom.

8. The planting pot and tray system of claim 7, wherein said rounded sides and said flat sides of each said pot extend from said bottom to said lip.

9. The planting pot and tray system of claim 8, wherein said lips of said pots project radially outwardly from said flat sides and said rounded sides of said pots.

10. The planting pot and tray system of claim 9, wherein said tray includes a horizontal upper wall with said receptacles defining receptacle openings in said upper wall for receiving said pots, and wherein said upper wall includes recesses at said receptacles wherein said lips of said pots are received by said recesses when said pots are received within said receptacles.

11. The planting pot and tray system of claim 1, wherein said tray includes a horizontal upper wall with said receptacles including receptacle openings for receiving said pots and wherein said receptacle openings are at least partially formed in said upper wall.

12. The planting pot and tray system of claim 11, wherein said tray includes two oppositely disposed and angled side walls, with said angled side walls extending from a perimeter of said tray upward toward said upper wall at an inwardly directed angle.

13. The planting pot and tray system of claim 1, wherein said tray includes two rows of receptacles.

14. The planting pot and tray system of claim 13, wherein said perimeter of said tray is generally rectangular, and wherein said tray includes two angled end side walls, and wherein said angled end side walls extend from said perimeter of said tray upward toward a horizontal upper wall at an inwardly directed angle.

15. The planting pot and tray system of claim 1, wherein said bottom of said pots are supported on said bases of said receptacles when stored therein.

16. The planting pot and tray system of claim 1, wherein said pots are tapered from said bottoms of said pots to openings of said pots with said openings being larger than said bottoms, and wherein said receptacles are correspondingly tapered from said bases.

17. A planting pot and tray system, said system comprising:
   a plurality of pots, each said pot having a bottom, a pair of opposed rounded sides, and a pair of opposed flat sides, with said rounded sides and said flat sides extending upwardly from said bottom;
   a tray, said tray including a plurality of receptacles configured to receive said pots, said receptacles including a base, a pair of side walls, a rear wall and a front wall;
   wherein said receptacles are configured to receive said pots whereby the respective shapes of said receptacle and said pot orient said pot within said receptacle, and wherein said rear wall of said receptacle extends higher than said front wall with said front wall disposed adjacent an outwardly facing opening whereby one of said rounded sides or one of said flat sides of said pot comprises an exposed side when said pot is received within said receptacle, wherein said exposed side of said pot is directed outwardly from said tray, and wherein said receptacles and said pots are configured such that each said pot is insertable into said receptacles in either of two orientations with either of said rounded sides comprising said exposed side portion or either of said flat sides comprising said exposed side portion.

18. The planting pot and tray system of claim 17, wherein said front wall and said rear wall comprise curved walls.

19. The planting pot and tray system of claim 17, wherein selected ones of said receptacles comprise end receptacles, and wherein said rear wall of said end receptacles extends higher than one of said side walls of said end receptacle whereby two of said walls of a said pot received within a said end receptacle are exposed.

20. The planting pot and tray system of claim 17, wherein said front wall and said rear wall comprise straight walls.

\* \* \* \* \*